United States Patent
Axmon et al.

(10) Patent No.: US 8,447,005 B2
(45) Date of Patent: May 21, 2013

(54) FREQUENCY SYNCHRONIZATION METHODS AND APPARATUS

(75) Inventors: Joakim Axmon, Kävlinge (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 493 days.

(21) Appl. No.: 12/612,800

(22) Filed: Nov. 5, 2009

(65) Prior Publication Data

US 2011/0103534 A1    May 5, 2011

(51) Int. Cl.
  *H04L 7/00*  (2006.01)
(52) U.S. Cl.
  USPC ............ 375/365; 375/142; 375/150; 375/343
(58) Field of Classification Search
  USPC ................... 375/136, 142, 147, 150, 343, 365
  See application file for complete search history.

(56) References Cited

U.S. PATENT DOCUMENTS

| | | | |
|---|---|---|---|
| 7,194,011 B1 * | 3/2007 | Nassiri-Toussi et al. | 370/503 |
| 2008/0267303 A1 * | 10/2008 | Baldemair et al. | 375/260 |
| 2009/0034589 A1 * | 2/2009 | Hahm et al. | 375/150 |
| 2011/0026413 A1 * | 2/2011 | Swarts et al. | 370/252 |

* cited by examiner

*Primary Examiner* — Curtis Odom
(74) *Attorney, Agent, or Firm* — Potomac Patent Group PLLC

(57) ABSTRACT

Methods and apparatus for have frequency offset estimation and cell search in radio communication systems take into account the time-frequency correlation properties of reference and synchronization signals in such systems. This reduces the probability of misdetection of the physical layer cell ID and frequency offset by accounting for time-frequency ambiguities and evaluating correlation signal peaks in the frequency domain, saving signal processing time and making initial cell search considerably faster. Also, lower-grade and hence cheaper oscillators can be used without causing problems in the user's experience with a receiver, such as a cellular telephone.

18 Claims, 12 Drawing Sheets

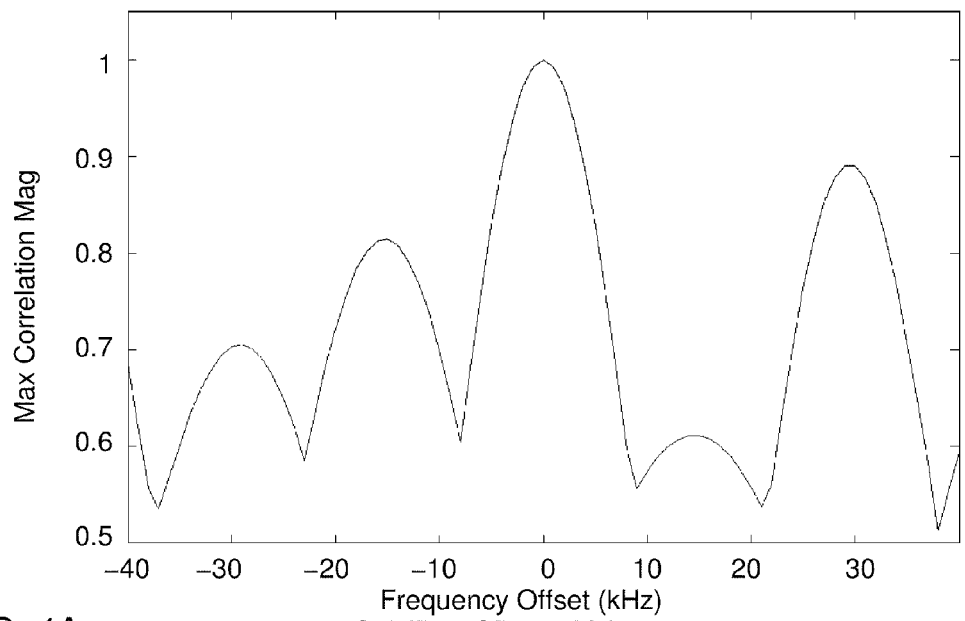
FIG. 4A  Cell ID 0, CP=32, MFL=128
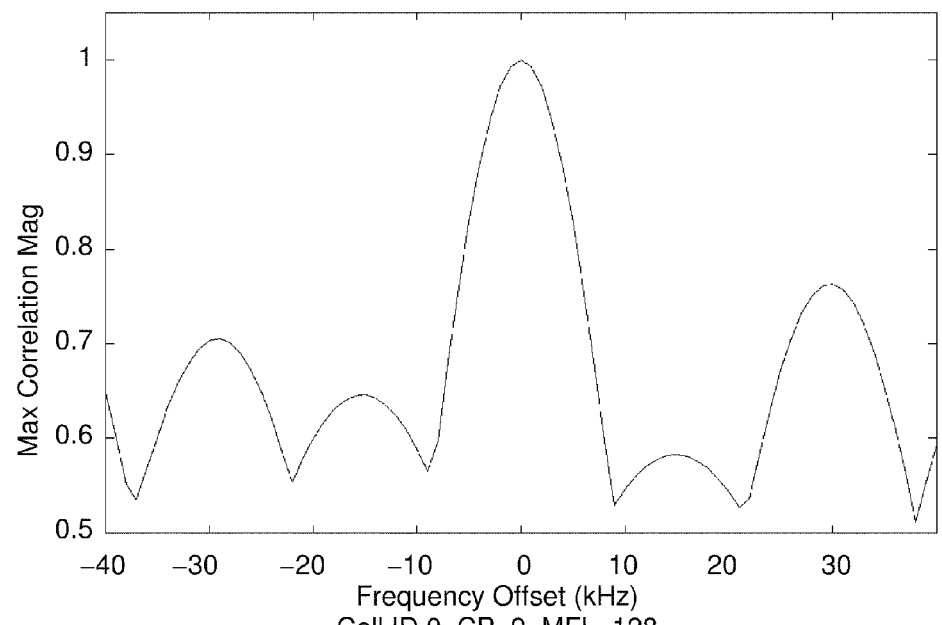
FIG. 4B  Cell ID 0, CP=9, MFL=128

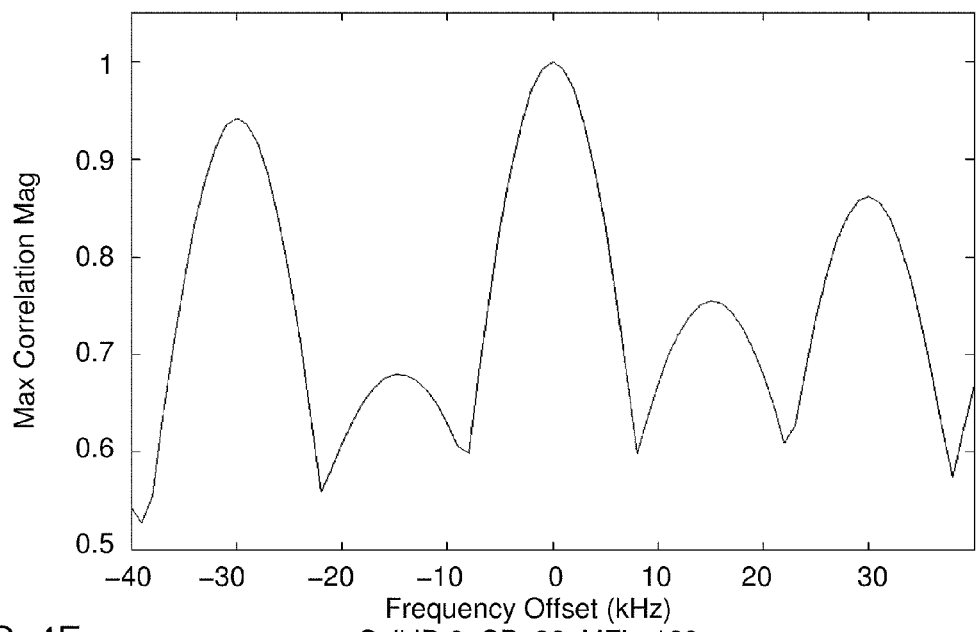
FIG. 4E  Cell ID 2, CP=32, MFL=128
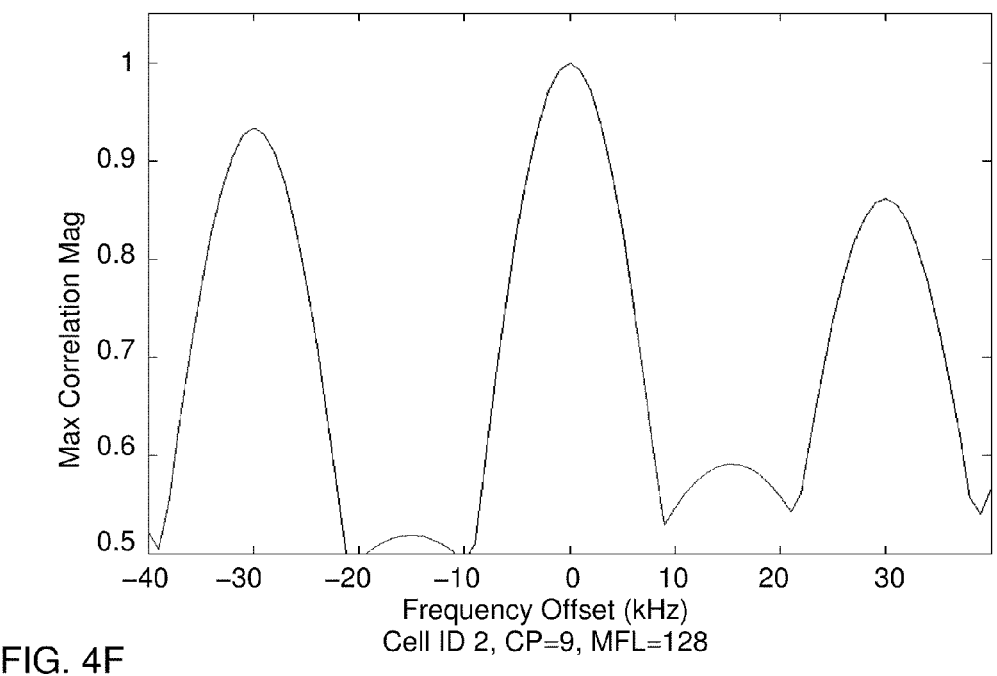
FIG. 4F  Cell ID 2, CP=9, MFL=128

FREQUENCY SYNCHRONIZATION METHODS AND APPARATUS

TECHNICAL FIELD

This invention relates to electronic communication systems, and more particularly to frequency synchronization of transmitters and receivers in radio communication systems.

BACKGROUND

Long Term Evolution (LTE) and High-Speed Packet Access (HSPA) cellular radio communication systems are sometimes called "third generation" (3G) systems and are currently being standardized by the Third Generation Partnership Project (3GPP). The LTE specifications can be seen as an evolution of the current wideband code division multiple access (WCDMA) specifications. An IMT advanced communication system (i.e., a "fourth generation" (4G) system) uses an internet protocol (IP) multimedia subsystem (IMS) of an LTE, HSPA, or other communication system for IMS multimedia telephony (IMT). The 3GPP promulgates the LTE, HSPA, WCDMA, and IMT specifications, and specifications that standardize other kinds of cellular wireless communication systems.

FIG. 1 depicts a typical cellular radio communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. In FIG. 1, RNC 12 is shown coupled to BSs 16, 18, 20, and RNC 14 is shown coupled to BSs 22, 24, 26.

Each BS, or eNodeB in LTE vocabulary, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 1 can be modified in LTE and other communication systems. For example, the functionality of the RNCs 12, 14 can be moved to the eNodeBs 22, 24, 26, and other functionalities can be moved to other nodes in the network. It will also be understood that a base station can use multiple transmit antennas to transmit information into a cell/sector/area, and those different transmit antennas can send respective, different pilot signals.

An LTE system uses orthogonal frequency division multiplex (OFDM) as a multiple access technique (called OFDMA) in the downlink (DL) from system nodes to user equipments (UEs). An LTE system has channel bandwidths ranging from about 1 MHz to 20 MHz, and supports data rates up to 100 megabits per second (Mb/s) on the largest-bandwidth channels. One type of physical channel defined for the LTE downlink is the physical downlink shared channel (PDSCH), which conveys information from higher layers in the LTE protocol stack and is mapped to one or more specific transport channels. The LTE physical layer, including the PDSCH and other LTE channels, is described in 3GPP Technical Specification (TS) 36.211 V8.7.0, Physical Channels and Modulation (Release 8) (June 2009), among other specifications.

In an OFDMA communication system like LTE, the data stream to be transmitted is portioned among a number of narrowband subcarriers that are transmitted in parallel. In general, a resource block devoted to a particular UE is a particular number of particular subcarriers used for a particular period of time. A resource block is made up of resource elements (REs), each of which is a particular subcarrier used for a smaller period of time. Different groups of subcarriers can be used at different times for different users. Because each subcarrier is narrowband, each subcarrier experiences mainly flat fading, which makes it easier for a UE to demodulate each subcarrier. Like many modern communication systems, DL transmissions in an LTE system are organized into frames of 10 milliseconds (ms) duration, and each frame typically includes twenty successive time slots. OFDMA communication systems are described in the literature, for example, U.S. Patent Application Publication No. US 2008/0031368 A1 by B. Lindoff et al.

For cell measurements, channel estimation, and other purposes, reference symbols or signals (RS), which may be called pilots, are transmitted from each eNodeB at known frequencies and time instants. RS are described for example in Sections 6.10 and 6.11 of 3GPP TS 36.211, and are transmitted from each of possibly 1, 2, or 4 transmit antennas of an eNodeB on particular REs that can be conveniently represented on a frequency-vs.-time plane as depicted in FIG. 2. It will be understood that the arrangement of FIG. 2 is just an example and that other arrangements can be used.

FIG. 2 shows an arrangement of subcarriers in resource blocks in two successive time slots, which can be called a sub-frame, in an LTE system. The frequency range depicted in FIG. 2 includes twenty-seven subcarriers, only nine of which are explicitly indicated. In FIG. 2, the resource blocks, which are indicated by dashed lines, each include twelve subcarriers spaced apart by fifteen kilohertz (kHz), which together occupy 180 kHz in frequency and 0.5 ms in time, or one time slot. FIG. 2 shows each time slot including seven OFDM symbols, or REs, each of which has a short (normal) cyclic prefix, although six OFDM symbols having long (extended) cyclic prefixes can be used instead in a time slot. It will be understood that resource blocks can include various numbers of subcarriers for various periods of time.

RS transmitted by a first transmit (TX) antenna of an eNodeB are denoted R and by a possible second TX antenna in the node are denoted by S. In FIG. 2, RS are depicted as transmitted on every sixth subcarrier in OFDM symbol 0 and OFDM symbol 4 (because the symbols have short cyclic prefixes) in every slot. Also in FIG. 2, the RSs in symbols 4 are offset by three subcarriers relative to the RS in OFDM symbol 0, the first OFDM symbol in a slot.

Besides reference signals, predetermined synchronization signals are provided for a cell search procedure that is a UE carries out in order to access the system, or network. The cell search procedure includes synchronizing the UE's receiver with the frequency, symbol timing, and frame timing of a cell's transmitted signal, and determining the cell's physical layer cell ID. The cell search procedure for an LTE system is specified in, for example, Section 4.1 of 3GPP TS 36.213 V8.6.0, Evolved Universal Terrestrial Radio Access (E-UTRA), Physical Layer Procedures (Release 8), June 2009.

LTE uses a hierarchical cell search scheme similar to WCDMA, in which eNodeB-UE synchronization and a cell group identity (ID) are obtained from different synchronization channel (SCH) signals. A primary synchronization channel (P-SCH) signal and a secondary synchronization channel (S-SCH) signal are defined with a pre-defined structure in Section 6.11 of 3GPP TS 36.211. For example, P-SCH and S-SCH signals can be transmitted on particular subcarriers in particular time slots. In an LTE system, the eNodeBs transmit two different synchronization signals: a primary synchronization signal (PSS) and a secondary synchronization signal (SSS) that are transmitted on a 5-ms basis in each cell.

FIG. 2 shows the SSS and PSS as OFDM symbols 5, 6 (assuming operation with the short cyclic prefix and frequency-division duplex (FDD). Current LTE systems have the PSS and SSS symbols transmitted in the middle six resource blocks in sub-frames 0 and 5. Comparable reference and synchronization channels are often provided in other digital communication systems, although they may be given different names.

The PSS exists in three versions, one for each of three cell-within-group IDs, and is based on Zadoff-Chu (ZC) sequences that are mapped onto the central 62 REs. ZC sequences are a special class of generalized chirp-like (GCL) sequences. A ZC sequence having a length N, where N is odd, and a sequence index u is defined by the following expression:

$$Z_u(k) = \exp(-j \cdot \pi / N \cdot u \cdot k \cdot (k+1)), k=0,1,\ldots,N-1.$$

The three different PSS signals in LTE are ZC sequences of the same length N with different sequence indices u. The PSS and SSS and aspects of ZC sequences and synchronization are described in U.S. Patent Application Publication No. US 2008/0267303 A1 by R. Baldemair et al.

There are in total 168 cell groups, and the SSS carries information, which is based on m-sequences, on which cell group a cell belongs to. The SSS also carries information on whether it is transmitted in subframe 0 or subframe 5, which is used for acquiring frame timing. For a particular cell, the SSS is scrambled with the cell's cell-within-group ID, and so in total there are 2×504 versions of the SSS, two for each of the 504 physical layer cell IDs. Like the PSS, the SSS is mapped onto the central 62 REs.

Before the UE has found its first cell, the UE acquires frequency synchronization by not only tuning its receiver to the frequency of the carrier signal transmitted by an eNodeB, but also finding any undesirable offset between the cell's carrier frequency and the frequency of the oscillator or signal generator used by the UE for demodulating its received signal. Methods and apparatus for determining and using frequency offsets are described in, for example, U.S. Patent Application Publication No. US 2008/0013650 by K. Engdahl and U.S. Pat. No. 7,443,826 to R. Atarius et al.

After frequency synchronization, cell search typically involves the UE's correlating its received signal with its local replicas of the three versions of the PSS, e.g., using a matched filter. The period of the correlation usually includes symbols received during at least 5 ms. Correlation signal peaks in the matched-filter output are used to acquire symbol synchronization, and can reveal synchronization signals from one or more cells.

After frequency and symbol synchronization using the PSS, the UE knows the position of the SSS and proceeds to decode the SSS to acquire frame timing and determine the cell's group ID. The information about which of the three PSS versions was received and the cell's group ID establishes the physical layer cell ID of the cell. The UE then has all the information it needs to read broadcast system information and establish communication with the cell. Moreover, cyclic prefix configuration and potentially even duplex mode is determined. SSS position determination and decoding is sometimes called SSS Detection in this application.

A frequency offset between the cell and the UE can arise when the UE's oscillator in its demodulator is ill-tuned. In general, the less expensive the UE's oscillator is, the wider its tuning tolerance is, and thus the larger the potential offset is when the UE is powered on. The PSS is robust against offset between a cell's carrier frequency and the UE's demodulation frequency. Under favorable radio conditions, it is possible to detect the PSS and its timing even if the frequency offset is as large as ±7.5 kHz, which is half the subcarrier spacing in an LTE system. As the SSS carries more information than the PSS, the SSS is more sensitive than the PSS to frequency offset. Hence, before detecting the SSS, the frequency offset has to be estimated/detected and mitigated.

It is known in the art that the frequency offset can be estimated by correlating the received PSS with one or more local copies of the PSS sequence over a grid of frequency offset hypotheses. That estimation can be implemented either by re-tuning the UE's oscillator to each frequency in the grid or by digitally shifting the correlators, or matched filters. The matched filter yielding the largest correlation metric (e.g., peak magnitude) is then considered to indicate both the cell ID (from the PSS version used) and the frequency offset (from the frequency shift of the filter or the oscillator). Such a frequency offset estimate can be refined in a number of ways, e.g., by using a denser grid of offset hypotheses, or by first using a coarse grid of hypotheses and then using a dense grid at timings detected with the coarse grid, among other ways. The invention described in this application is independent of the strategy chosen for frequency offset refinement. Correlating a received signal against local PSS replicas with or without frequency offset hypotheses is sometimes called PSS Detection in this application.

The time-domain correlation properties of the ZC sequences upon which the PSS is based are robust against small frequency errors as noted above, and so even if there is a small frequency offset, a peak in the PSS matched filtering still accurately indicates the position of the received PSS. Nevertheless, if the frequency offset is larger than about ±22.5 kHz, spurious correlation peaks of substantial magnitude can arise at positions other than the start of the received PSS symbol. In the presence of noise, those spurious peaks can be as large as or even larger than the correlation peak at the correct timing and frequency offset. As a result, when testing frequency offset hypotheses, the UE can erroneously deduce that it has tuned in to the correct carrier frequency (within ±7.5 kHz), by which the UE will assume an incorrect symbol timing, and ultimately will find an incorrect physical layer cell ID after decoding the SSS. Depending on how a UE is implemented, if those errors go undetected, they can result in wasted radio resources and a longer initial cell search and even a failed cell search in unfavorable radio conditions.

Many previous approaches to mitigating the problems arising from large frequency offset errors involve the use of a high-quality oscillator with low tolerances such that even before tuning, the frequency offset never exceeds about ±20 kHz. Those approaches are undesirable for several reasons, e.g., because high-quality oscillators are expensive and can increase the complexity and energy consumption of the UE.

SUMMARY

In accordance with aspects of this invention, there is provided a method in a receiver of determining a timing and a frequency offset of a received signal, the signal being predetermined. The method includes correlating, in the receiver, the received signal to each of a plurality of local replicas of a first predetermined signal, where the local replicas correspond to respective, different frequency offsets $f_i$, i=1, 2, ..., N, in a frequency offset range $[f_a, f_b]$, thereby forming a plurality of first correlation results. The method further includes determining a maximal peak $f_{max}$ and a timing $t_{max}$ of the maximal peak $f_{max}$ in the plurality of first correlation results, and determining at least one frequency offset $f_j$ based on the maximal peak $f_{max}$ and at least one other timing $t_j$ based on $t_{max}$. The offset $f_j$ and timing $t_j$ are also based on characteristics of the first predetermined signal. The method further includes correlating, in the receiver, the received signal at $(t_{max}, f_{max})$ and $(t_j, f_j)$ to a second predetermined signal, thereby forming at least two second correlation results; and determining the maximum of the at least two second correlation results, thereby determining the timing and the frequency offset.

In another aspect of the invention, there is provided a computer-readable medium having stored instructions that, when executed by a computer, cause the computer to carry out a method of determining a timing and a frequency offset of a received signal, the signal being predetermined. The method includes correlating the received signal to each of a plurality of local replicas of a first predetermined signal, where the local replicas correspond to respective, different frequency offsets $f_i$, i=1, 2, ..., N, in a frequency offset range $[f_a, f_b]$, thereby forming a plurality of first correlation results. The method further includes determining a maximal peak $f_{max}$ and a timing $t_{max}$ of the maximal peak $f_{max}$ in the plurality of first correlation results, and determining at least one frequency offset $f_j$ based on the maximal peak $f_{max}$ and at least one other timing $t_j$ based on $t_{max}$. The offset $f_j$ and timing $t_j$ are also based on characteristics of the first predetermined signal. The method further includes correlating the received signal at $(t_{max}, f_{max})$ and $(t_j, f_j)$ to a second predetermined signal, thereby forming at least two second correlation results; and determining the maximum of the at least two second correlation results, thereby determining the timing and the frequency offset.

In another aspect of the invention, there is provided an apparatus in a receiver for determining a timing and a frequency offset of a received signal, the signal being predetermined. The apparatus includes a signal detector configured to correlate the received signal to each of a plurality of local replicas of a first predetermined signal, wherein the local replicas correspond to respective, different frequency offsets $f_i$, i=1, 2, ..., N, in a frequency offset range $[f_a, f_b]$, thereby forming a plurality of first correlation results; to determine a maximal peak $f_{max}$ and a timing $t_{max}$ of the maximal peak $f_{max}$ in the plurality of first correlation results; to determine at least one frequency offset $f_j$ based on the maximal peak $f_{max}$ and at least one other timing $t_j$ based on $t_{max}$, wherein $f_j$ and $t_j$ are also based on characteristics of the first predetermined signal; to correlate the received signal at $(t_{max}, f_{max})$ and $(t_j, f_j)$ to a second predetermined signal, thereby forming at least two second correlation results; and to determine the maximum of the at least two second correlation results, thereby determining the timing and the frequency offset.

BRIEF DESCRIPTION OF THE DRAWINGS

The several features, advantages, and objects of this invention will be understood by reading this description in conjunction with the drawings, in which:

FIGS. 4A, 4B, 4C, 4D, 4E, and 4F are plots of correlation magnitudes that depict the dependence on frequency offset of ZC sequences;

DETAILED DESCRIPTION

This description focusses on an LTE communication system for economy of explanation, but the artisan will understand that the invention in general can be implemented in other electronic communication systems.

The inventors have recognized that the time-frequency correlation properties of ZC sequences can be taken into account for joint cell search and frequency offset estimation. For example, a correlation signal peak at timing T for a frequency offset hypothesis F in a PSS Detection can be used as the basis for hypotheses that the PSS symbol start and carrier frequency are one of (T, F), (T−X, F+(n·30) kHz), (T+X, F−(n·30) kHz), ..., where X is a cell-ID-dependent timing adjustment, n is a positive integer, and 30 kHz is a frequency offset that generally depends on the particulars of the communication system as described below. Hypotheses that are within the tolerance of the UE's oscillator are examined and validated through metrics from SSS Detection. The "winning" hypothesis is the hypothesis that gives the physical layer cell ID, the cell's configuration, and the frequency offset.

A circular correlation signal that is indicative of the PSS correlation signal can be described as follows:

$$\rho_i(\tau, \Delta f) = \sum_{n=0}^{127} (p_i(n)e^{j2\pi\Delta fn})p_i^*(\text{mod}(n+\tau, 128)) \quad \text{Eq. 1}$$

in which $p_i(n)$, n=0, ..., 127 is a discrete time-domain representation of the ZC sequence associated with the cell ID i∈{0, 1, 2}; $\Delta f$ is a normalized frequency offset; τ is the timing offset measured in received-signal samples; and * indicated complex conjugation. A typical sampling rate is 1.92 MHz, with which a net LTE OFDM symbol is 128 samples long.

As described in above-cited Publication No. US 2008/0267303, the distance between the desired main peak position and secondary peaks in the output signals of matched filters in a receiver is determined by the ZC sequence index u, and whether a secondary peak leads or trails the main peak is determined by the sign of the frequency offset.

Figure 1:
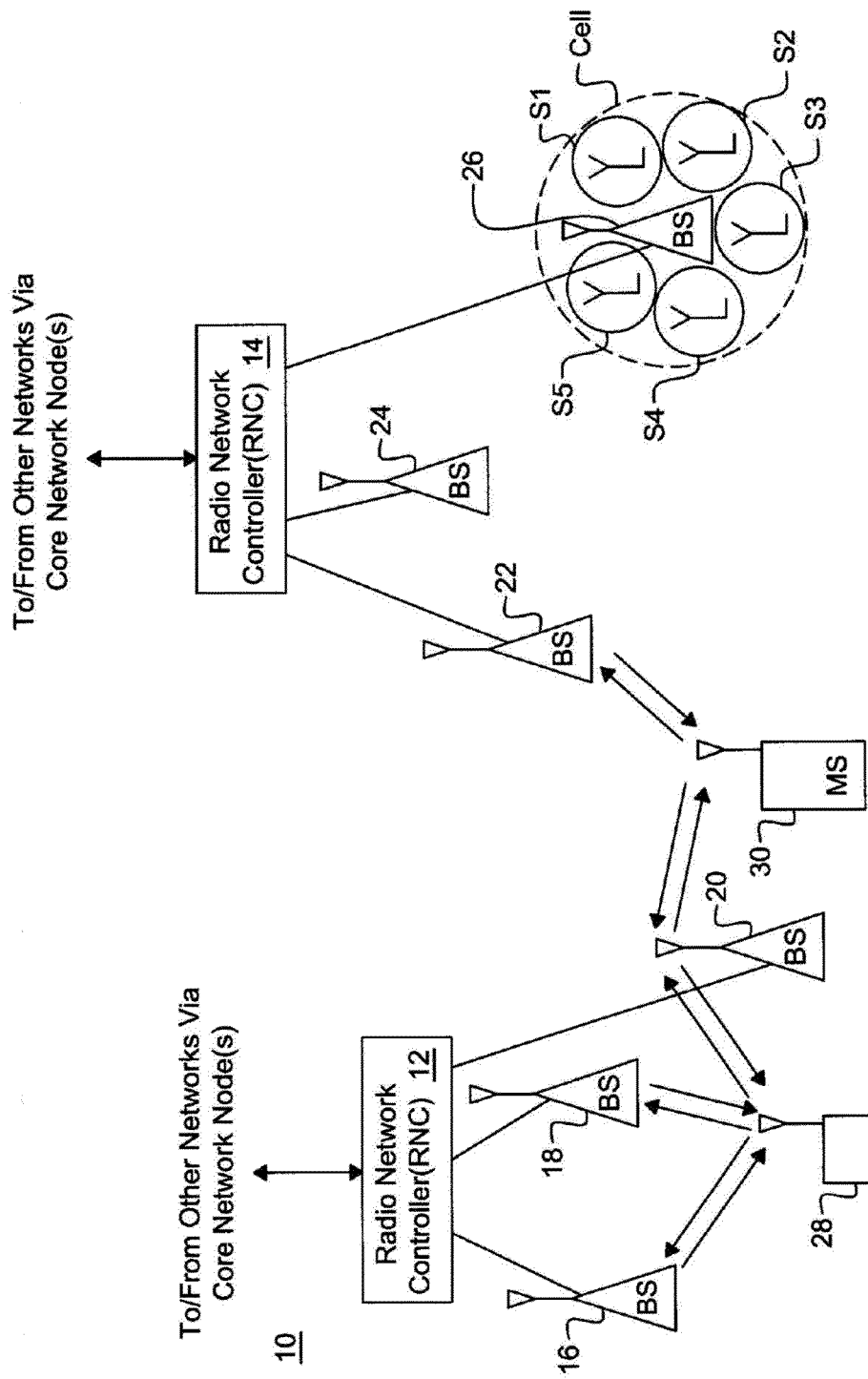
FIG. 1 depicts a cellular radio communication system.
Figure 2:
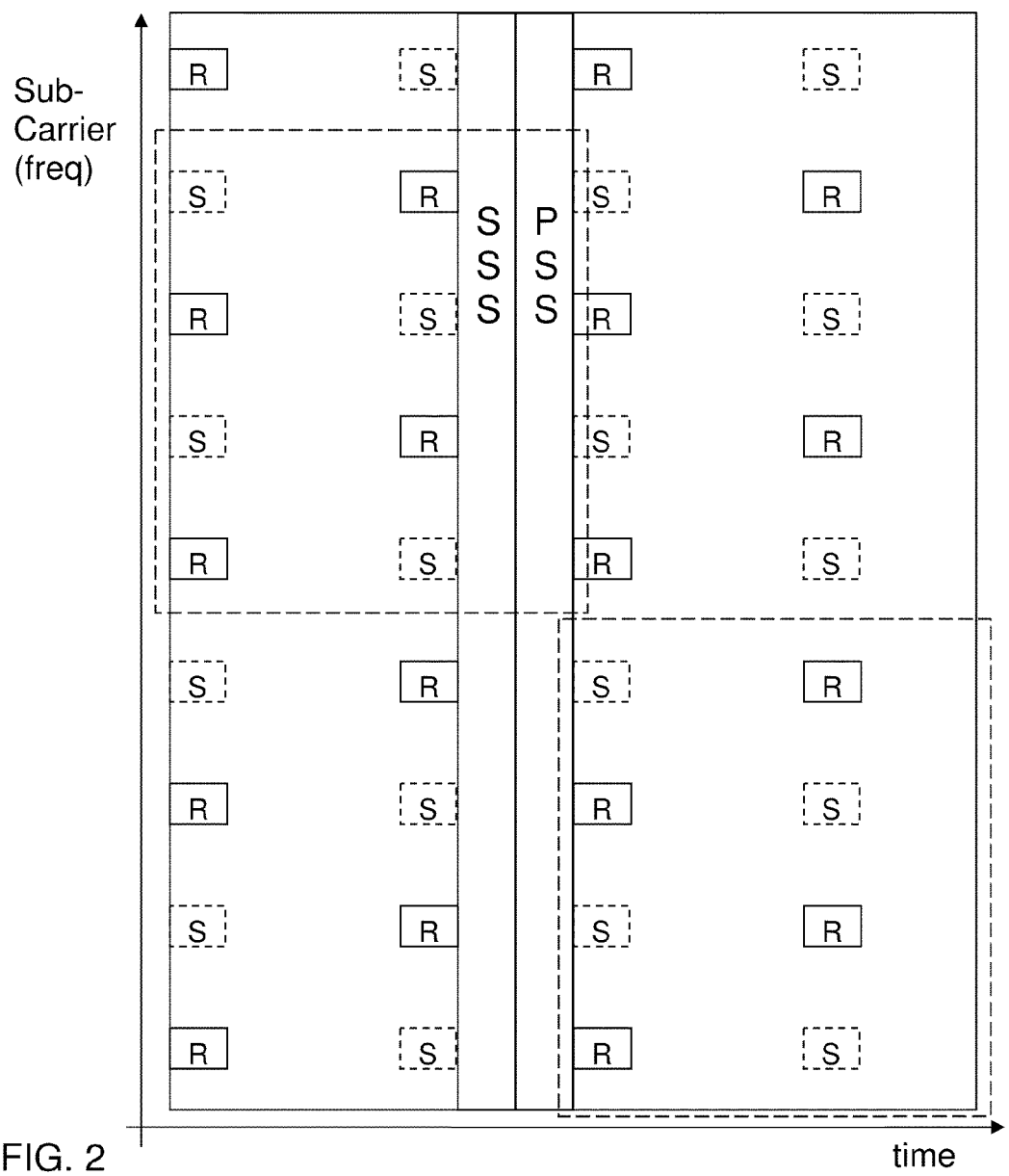
FIG. 2 depicts reference, primary synchronization, and secondary synchronization symbols in a communication system that uses orthogonal frequency division multiple access.
Figure 3A:
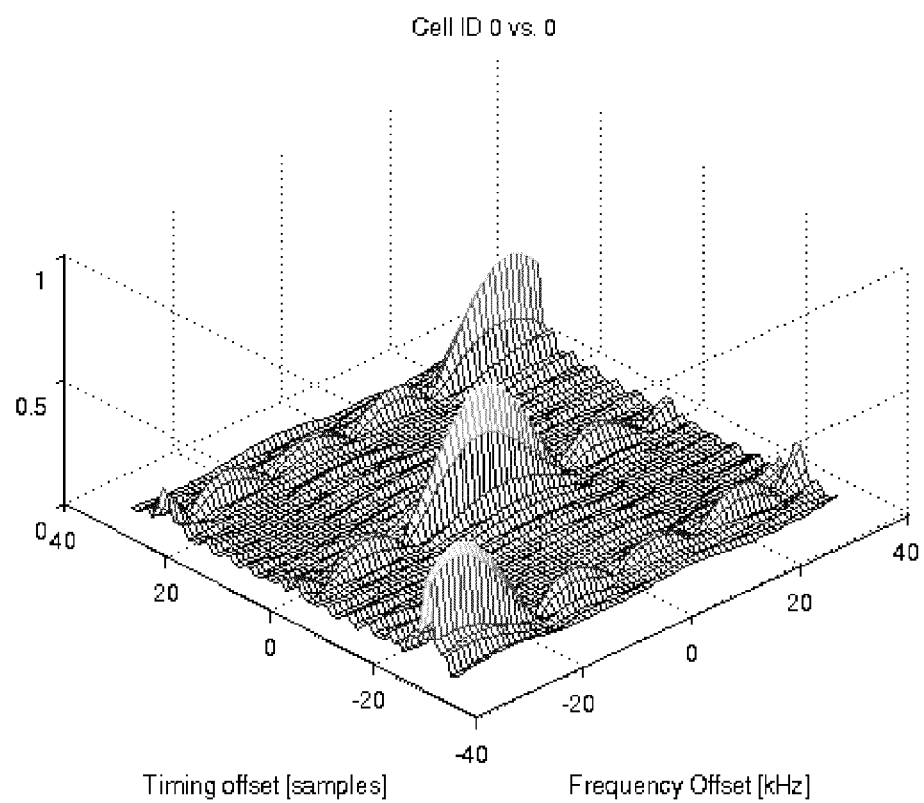
FIGS. 3A, 3B, and 3C are plots of circular correlation signals that depict the cyclic time-domain correlation properties of ZC sequences.
Figure 3B:
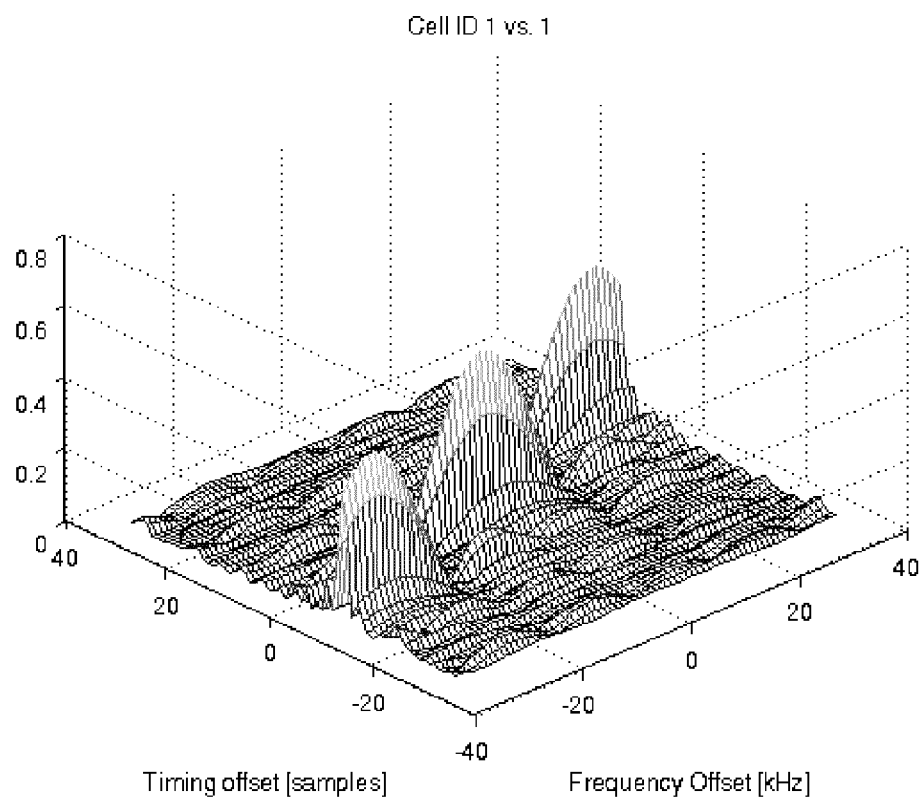
Figure 3C:
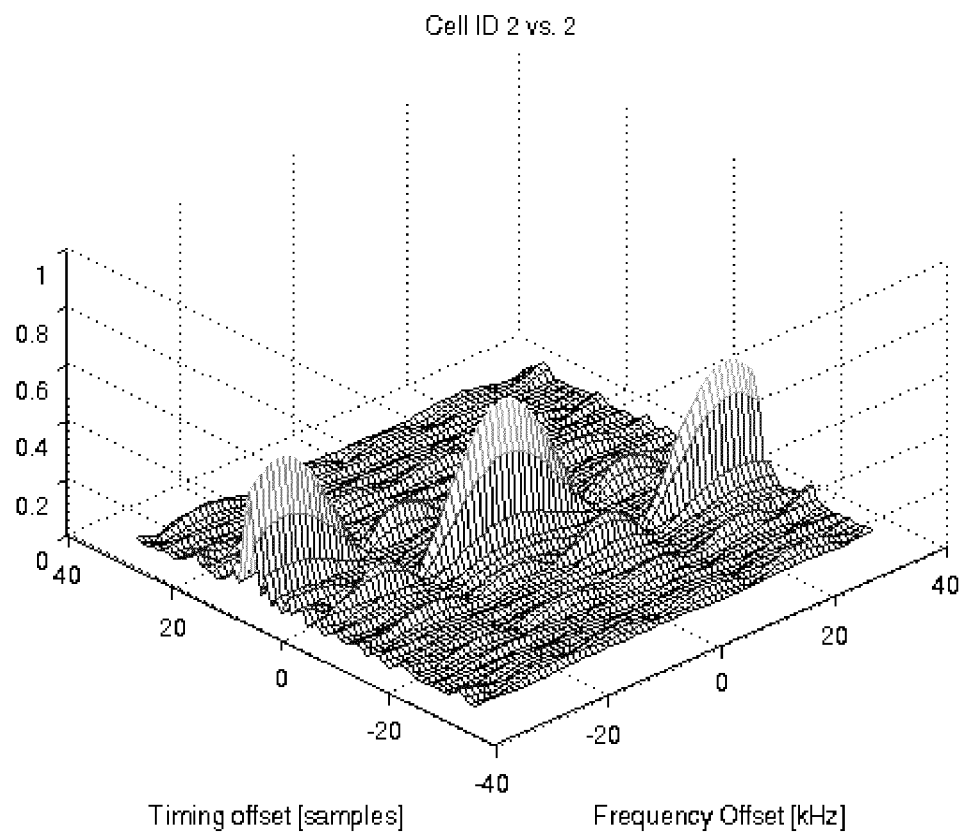

FIGS. 3A, 3B, and 3C are timing offset T vs. frequency offset F vs. correlation magnitude plots of circular correlation signals that are indicative of correlation signals that might be generated during PSS Detection. FIG. 3A depicts the cyclic time-domain correlation properties of a ZC sequence for Cell ID 0 in the presence of frequency offset with a sampling rate of 1.92 MHz. FIG. 3B depicts the cyclic time-domain correlation properties of a ZC sequence for Cell ID 1 in the presence of frequency offset with a sampling rate of 1.92 MHz. FIG. 3C depicts the cyclic time-domain correlation properties of a ZC sequence for Cell ID 2 in the presence of frequency offset with a sampling rate of 1.92 MHz. Cyclic, or circular, correlation is examined because that is experienced in matched filtering due to the extension of LTE OFDM symbols by cyclic prefixes. In particular, a normal cyclic prefix corresponds to 9 or 10 samples and an extended cyclic prefix corresponds to 32 samples at a sampling rate of 1.92 MHz.

FIGS. 3A-3C show that the main correlation peak at timing offset T=0 samples and frequency offset F=0 Hz in each figure has the largest magnitude, but also that all three ZC sequences experience spurious peaks at frequency offsets of F=±30 kHz and at different time lags (timing offsets T) for the different sequences (i.e., different cell IDs). Several of the spurious peaks are almost as large as the main peak, and in presence of noise and other disturbances, such as transmissions in neighboring cells, a spurious peak can occasionally appear to be larger than a main peak. Thus, cell search algorithms that focus only on peak magnitude in the time-domain when identifying the frequency offset will inevitably result in misdetections at low signal-to-noise ratios (SNRs).

It will be understood that FIGS. 3A-3C show circular correlations and so do not correspond exactly to results in PSS Detection. Nevertheless, FIGS. 3A-3C illustrate that correlation peaks are shifted in time for different frequency offsets, and are shifted differently depending on ZC sequence. In practice, a matched filter and the PSS cannot overlap as much as a circular correlation.

FIGS. 4A-4F are plots of the maximum correlation magnitude vs. frequency offset F of correlation signals that might more realistically be generated during PSS Detection. The different figures show different combinations of Cell ID, cyclic prefix CP, and matched-filter length MFL, with sampling rates of 1.92 MHz. The normal cyclic prefix corresponds to CP=9, and the extended cyclic prefix corresponds to CP=32. FIGS. 4A-4F show how the maximum correlation values depend on frequency offset, indicating, like FIGS. 3A-3C, the reason particular frequency offsets (with associated timings) must be taken into account.

As seen in FIGS. 3 and 4, timing-and-frequency-offset hypotheses (T, F) differ according to cell ID, and those differences are summarized in the following Table 1 that illustrates the time-domain correlation behavior of ZC sequences in the presence of frequency offsets.

TABLE 1

| Cell ID | Frequency Offset F (kHz) | | | |
|---|---|---|---|---|
| | −30 | −15 | 0 | 30 |
| 0 | T = 26 | T = −52 | T = 0 | T = −26 |
| 1 | T = 10 | — | T = 0 | T = −10 |
| 2 | T = −10 | — | T = 0 | T = 10 |

In Table 1, the tolerance of the oscillator is assumed to be ±30 kHz, and so only peaks up to ±30 kHz are included in the Table. The time shifts T are given in terms of numbers of samples. For larger UE tolerances, the table can be expanded accordingly.

If an initial frequency-offset estimation is carried out solely in the time-domain, multi-path components may arise depending on radio propagation conditions that will act as additional interference to other cells and background noise. A peak that appears to be the strongest in a time-domain PSS Detection may not be so when the symbol is analyzed in the frequency domain, as multi-path components are combined when the symbol is transformed to the frequency domain. Combination is inherent in OFDM with cyclic prefix as in an LTE system.

This invention takes into account that a peak detected in a time-domain analysis might not reveal the true symbol position and frequency offset, but may indicate one of the spurious peaks at ±30 kHz (or at other positions if the tolerance of the oscillator is large). Therefore, when a peak is found, peaks at alternative timing-frequency offset positions (T, F) are hypothesized, and then the detected and the hypothesized peaks are evaluated/validated by SSS Detection executed in the frequency domain. The hypothesis that is within the tolerance of the oscillator and yields the highest metrics is selected.

The metrics from the SSS Detection for a particular timing that are used in the evaluation/validation can be the absolute value or just the real part of the correlation metric related to the winning cell group ID alone. Nevertheless, as the received signal power of different data segments may vary depending on cell load conditions, interference, etc., it can be advantageous also to use the ratio of the largest correlation metric (real part or absolute value) to the standard deviation of all correlation values for other hypotheses (if the search is exhaustive), the signal-to-interference ratio (SIR), and/or other measured received signal parameters.

It will be appreciated that although the SSS can be used for joint cell group ID and frequency offset detection, one can use any other signal that is known in advance and unique (within a wide enough area) to a particular cell. One such signal is the RS, which carries more or less the same information as acquired by SSS Detection (i.e., cell group ID, cyclic prefix length, timing). Thus, the artisan will understand that this invention is not restricted to use of the SSS.

In addition, the particular values of the timing offsets depicted for example in Table 1 can depend on UE implementation, and so deviations from the precise values in Table 1 are anticipated. In general, given a correlation signal peak at a timing T and for a frequency offset F, peaks at other time-frequency-offset locations (T, F) can be hypothesized.

Figure 5:
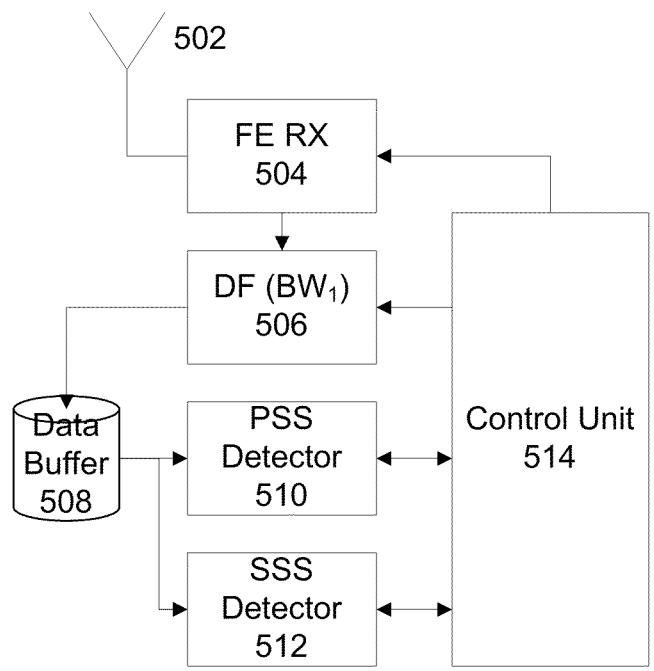
FIG. 5 is a block diagram of a portion of receiver in a radio communication system.
Figure 4C:
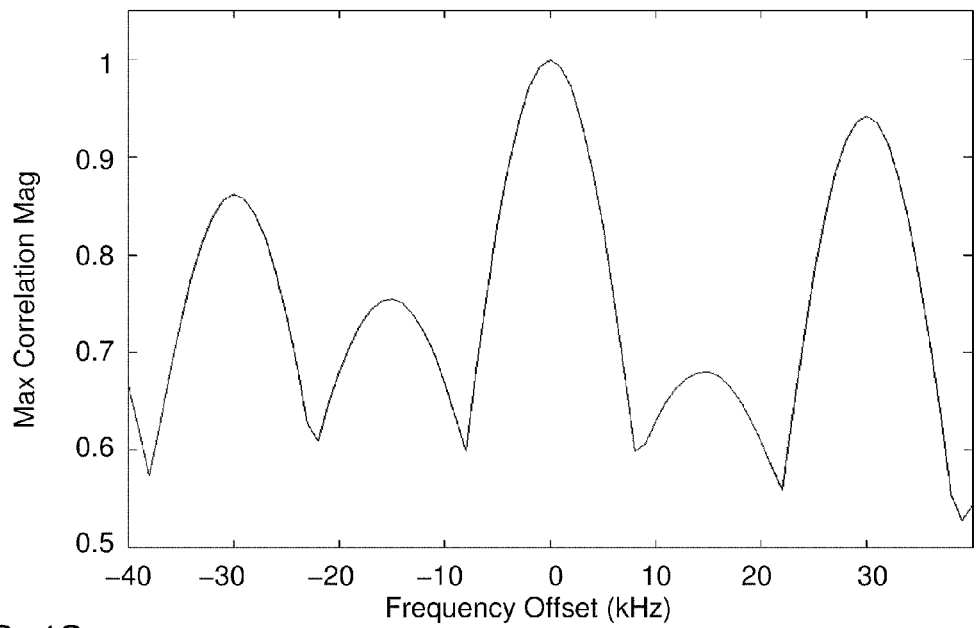
Figure 4D:
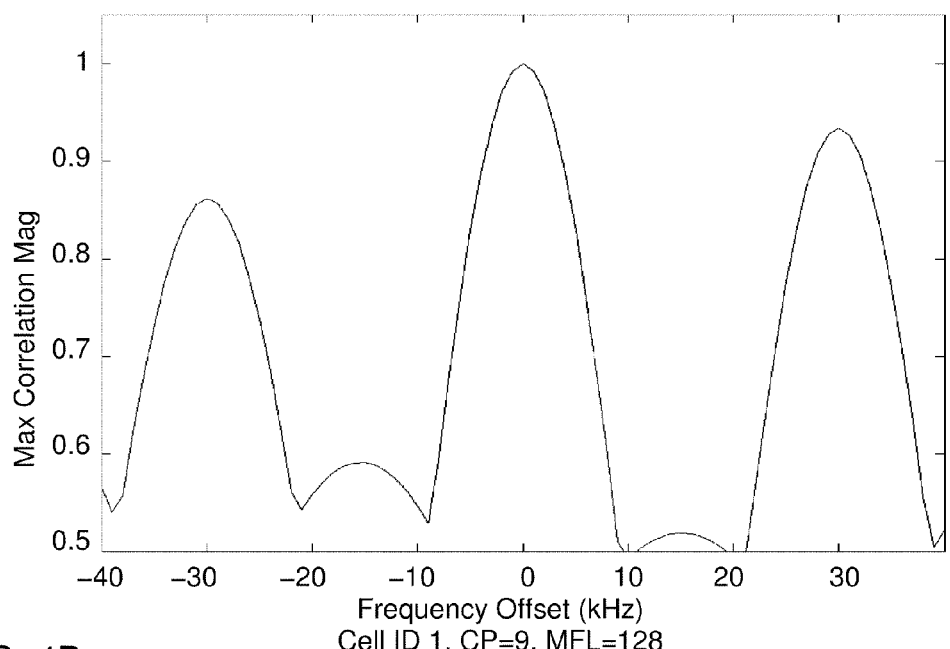

FIG. 5 is a block diagram of a portion 500 of a receiver that is suitable for carrying out the methods described in this application. Portions of radio signals transmitted by transmitters such as eNodeBs are collected by an antenna 502 and passed to a receiver front end (FE RX) 504 that typically down-converts the received radio signal to an analog baseband signal. The baseband signal is spectrally shaped by a suitable digital filter (DF) 506 that has a bandwidth BW1, which corresponds to the bandwidth of the synchronization signals (OFDM symbols) included in the transmitted/received signal. The shaped baseband signal generated by the filter 506 is temporarily stored in a data buffer 508 that provides the stored signal to a PSS Detection unit 510 and an SSS Detection unit 512. The Detection units 510, 512 carry out one or more methods of searching for cells as specified for the particular communication system, e.g., LTE, that typically involve detecting the predetermined PSS and SSS in the received signal. The Detection units 510, 512 communicate their results by suitable signals to a control unit 514, which also controls the operation of the FE RX 504, DF 506, and Detection units 510, 512. The control unit 514 keeps track of information needed to configure the filter 506 and detection unit 510, 512. Communication between the detection units 510, 512 and the control unit 514 can include cell ID, for example.

The PSS Detection unit 510 includes any suitable kind of correlator that is matched to the time-domain representation of the PSS or equivalent synchronization signal, which is to say that the receiver includes a matched filter having an impulse response that corresponds to a mirrored (time-reversed) complex-conjugate of the PSS. To handle an unknown frequency offset, the PSS Detection unit 510 preferably includes several parallel matched filters, with each of the several matched filters having an impulse response matched to the synchronization signal with a different respective assumed frequency offset. It will be understood that such matched filters can be implemented in hardware devices, such as tapped delay lines, correlators that compare input sequences to expected sequences, and equivalent devices, or as a suitably programmed or configured electronic processor. For example, U.S. Pat. No. 7,003,022 to Urabe et al. describes matched filters and receivers for mobile radio communication systems. The control unit 514 is suitably configured to compare the real parts or magnitudes of the outputs of all of the matched filters in the unit 510 and select that filter having the highest correlation peak according to a method of cell search and frequency selection such as those described below.

The data buffer 508 enables "offline" search using samples of a received signal that are stored in the buffer. This permits turning off the FE RX 504 to save power. As an alternative, the received signal can pass directly from the filter 506 to the PSS Detector 510.

It will be appreciated that the SSS Detector 512 can compute channel estimates based on PSS symbols detected by the PSS Detection unit, and can use the channel estimates for equalizing the channel before coherent SSS detection. Methods of channel estimation are well known in the art, and are described in, for example, U.S. Patent Application Publication No. 2005/0105647 by Wilhelmsson et al. for "Channel Estimation by Adaptive Interpolation". Channel estimates are not necessary, however, as the SSS Detection unit could perform non-coherent SSS detection.

Figure 6A:
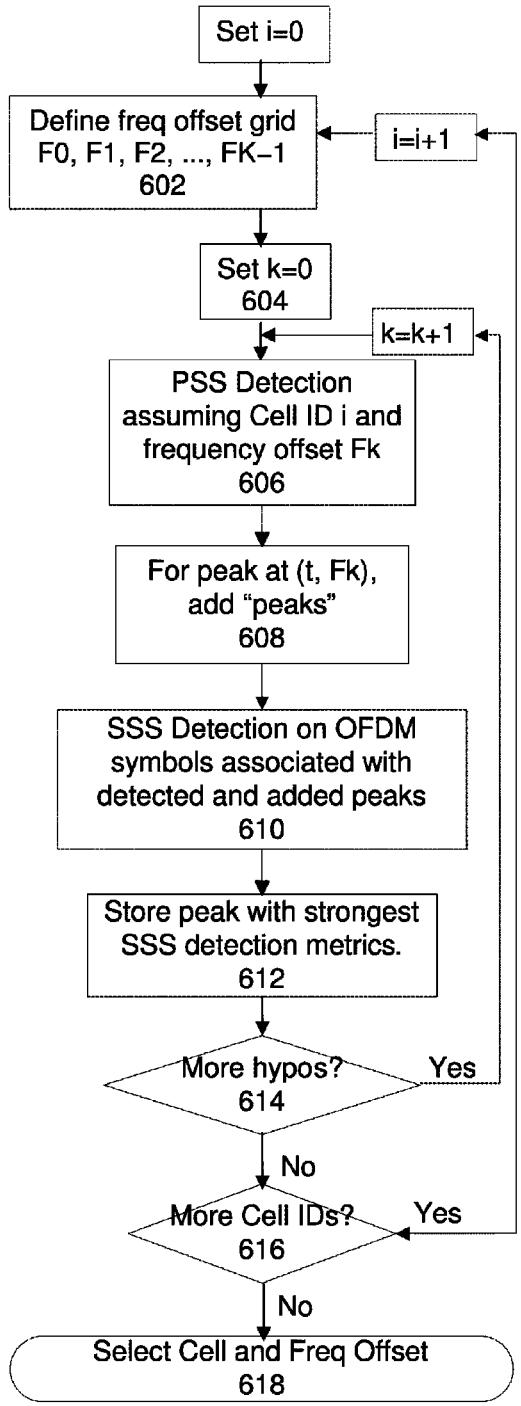
FIGS. 6A, 6B, 6C, and 6D are flow charts of methods of cell search and frequency synchronization.

FIG. 6A is a flow chart of a method of initial cell search and frequency synchronization as described above. A cell ID counter i is set to zero and the method is initialized (step 602) by defining a grid of K frequency-offset hypotheses F0, F1, F2, ..., F(K−1), and setting (step 604) a hypothesis counter k to zero. In step 606, otherwise conventional PSS Detection determines a correlation signal peak at a timing t for a frequency offset hypothesis Fk and a cell ID i. In step 608, peaks are "added" (i.e., hypothesized) at time-frequency-offset positions for different Cell IDs as indicated in Table 1, for example. The number of "added" peaks and their time-frequency positions depend on the oscillator's tolerance and Cell ID as described above. In step 610, otherwise conventional SSS Detection is then carried out for OFDM symbols associated with all detected and "added" peaks in steps 606 and 608. In step 612, the time- and frequency-offset information and the cell ID of the PSS correlation signal peak that yields the strongest SSS Detection metrics are recorded, e.g., stored in a suitable memory. If there are more frequency-offset hypotheses in the grid (Yes in step 614), the hypothesis counter k is incremented and the process flow returns to step 606. If there are more possible cell IDs, (Yes in step 616), the cell-ID counter i is incremented and the process flow returns to step 602. Otherwise (No in steps 614 and 616), the cell and frequency offset associated with the strongest SSS Detection metrics among the stored peaks are selected (step 618), yielding both the cell group ID and best (i.e., closest) frequency-offset hypothesis.

Thus, the method depicted in FIG. 6A can be thought of as detecting PSS correlation peaks based on candidate cell IDs and a set of hypothetical frequency offsets (steps 602-606, 614, 616), adding a set of hypothetical peaks based on the selected peaks (step 608), validating each of the detected and hypothetical peaks (step 610), selecting from among the validated peaks (step 612), and confirming one of the selected peaks (step 618).

Figure 6B:
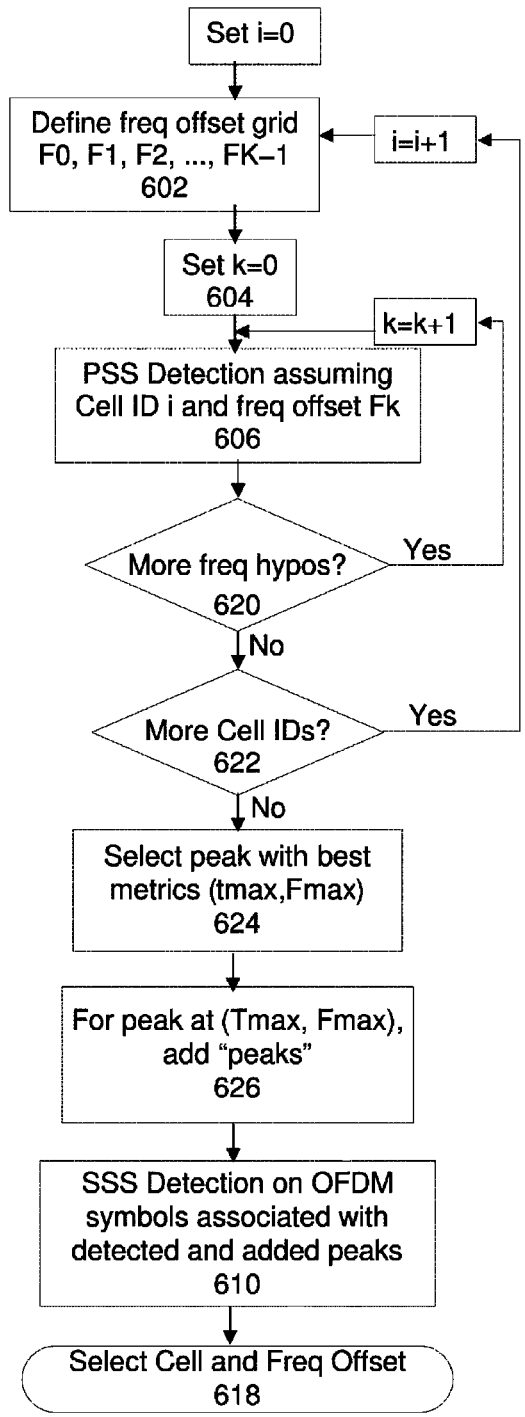

FIG. 6B is a flow chart of an alternative method of initial cell search and frequency synchronization as described above. Steps in FIGS. 6A and 6B that are substantially the same have the same reference numbers. As in the method depicted by FIG. 6A, PSS Detection is carried out for all frequency offset hypotheses in a grid of such hypotheses, and the method is initialized in the same way. Also, otherwise conventional PSS Detection determines a correlation signal peak at a timing t for a frequency offset hypothesis Fk and a cell ID i in step 606.

If there are more frequency-offset hypotheses in the grid (Yes in step 620), the hypothesis counter k is incremented and the process flow returns to step 606. If there are more possible cell IDs, (Yes in step 622), the cell-ID counter i is incremented and the process flow returns to step 602. Otherwise (No in steps 620 and 622), the PSS correlation signal peak having the largest correlation is selected (step 624). Letting that correlation peak have time- and frequency-offset positions (Tmax, Fmax), "added" peaks are hypothesized (step 626) at time-frequency-offset positions for different Cell IDs as indicated in Table 1, for example. As in step 608 in FIG. 6A, the number of "added" peaks and their time-frequency positions depend on the oscillator's tolerance and Cell ID as described above.

In FIG. 6B, otherwise conventional SSS Detection is carried out (step 610) for OFDM symbols associated with all detected and "added" peaks in steps 624 and 626. The cell and frequency offset associated with the strongest SSS Detection metrics are selected (step 618), yielding both the cell group ID and best (i.e., closest) frequency-offset hypothesis.

Thus, the method depicted in FIG. 6B can be thought of as detecting PSS correlation peaks based on candidate cell IDs and a set of frequency offsets (steps 602-608, 620, 622), selecting from among detected peaks at candidate cell IDs and frequency offsets (step 624), adding a set of hypothetical peaks based on the selected peaks, validating each of the detected and selected peaks (step 610), and confirming one of the validated peaks (step 618).

Figure 6C:
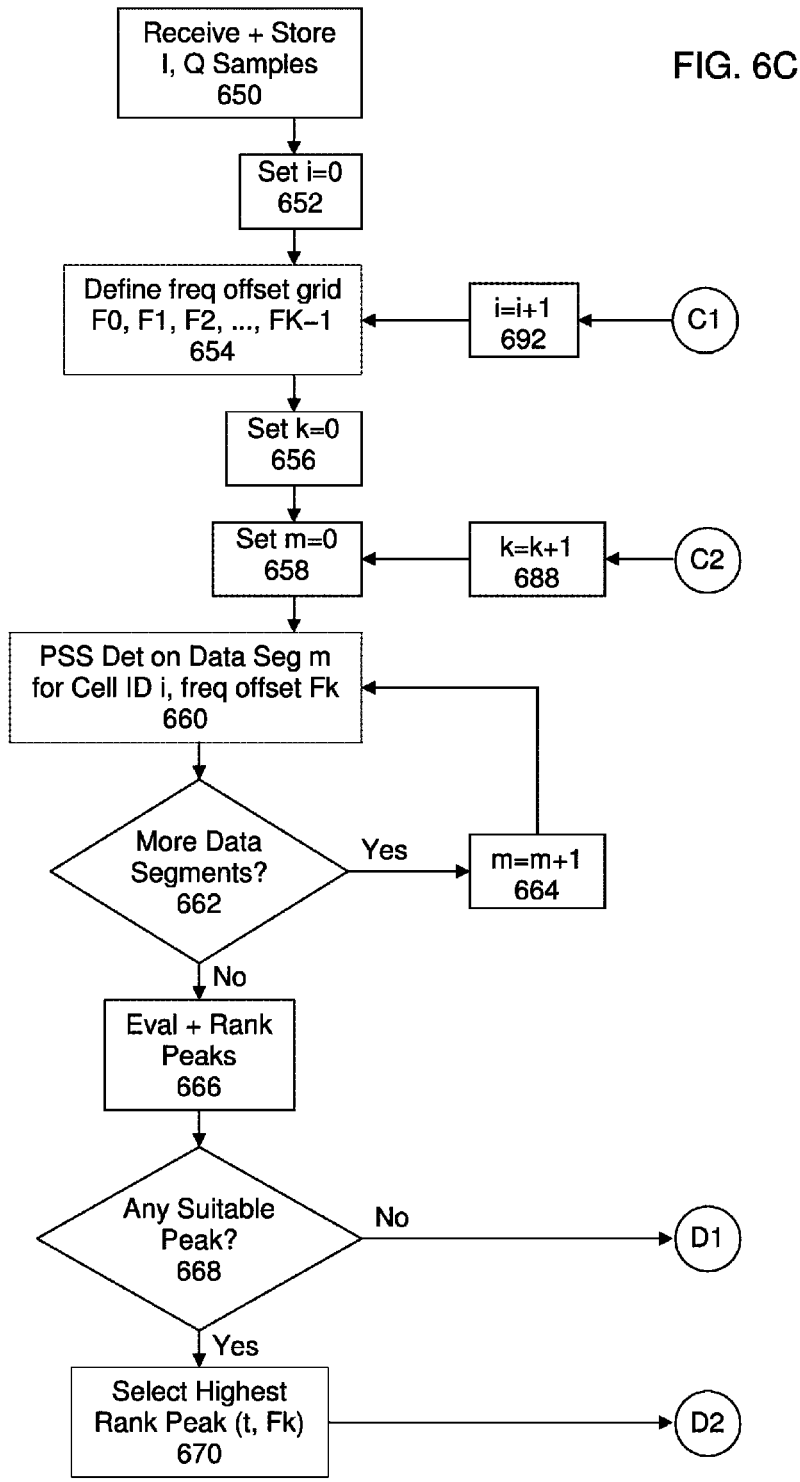
Figure 6D:
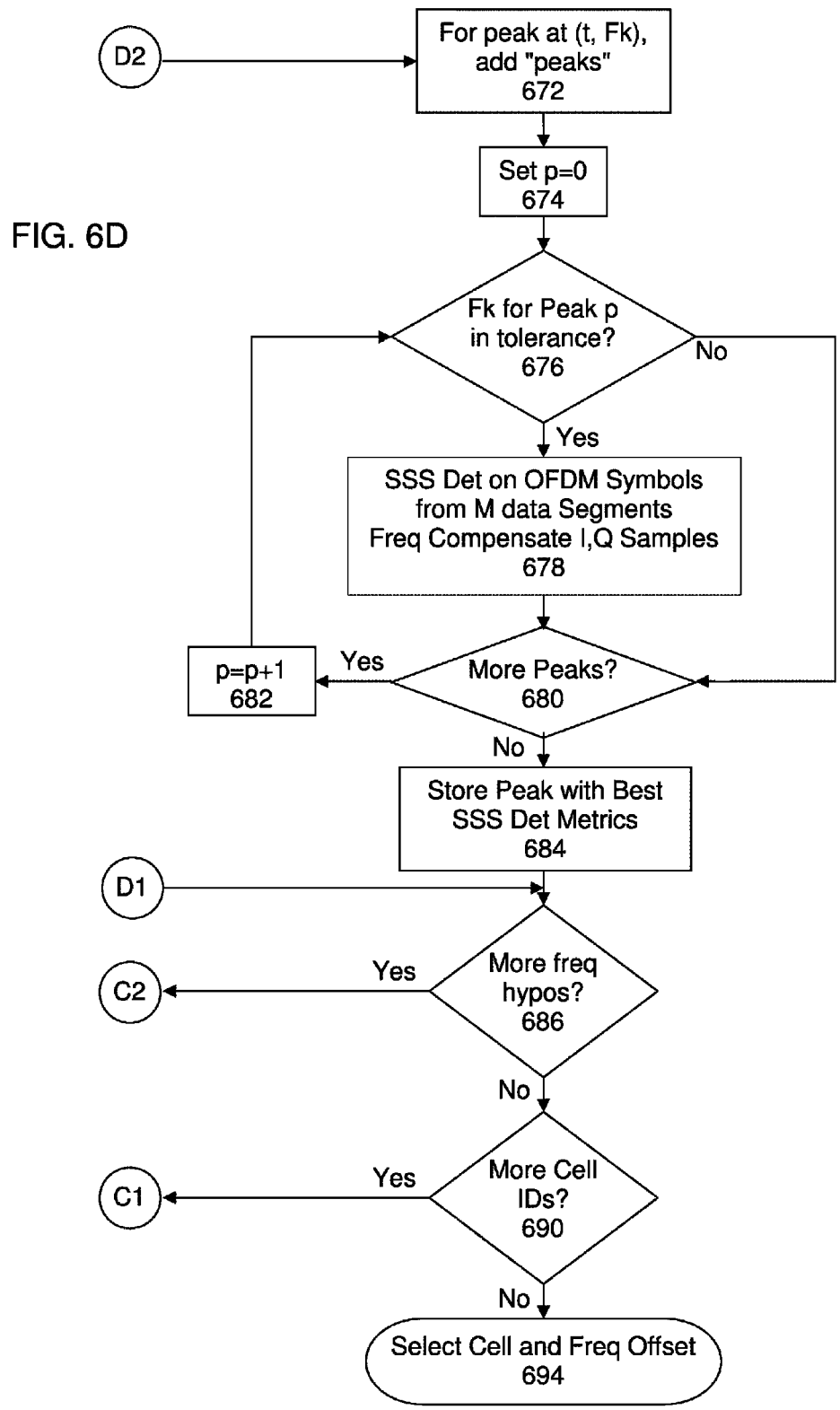

FIGS. 6C-6D are a flow chart of another alternative method of initial cell search and frequency synchronization as described above, in which PSS Detection is carried out over multiple 5-ms-long data segments, and the peak that is found the most times is selected. If more than one peak is found the same number of times, those peaks can be ranked according to one or more additional criteria (e.g., strongest correlation, strongest momentary SNR, among others), and the highest ranked peak is selected. As in the methods depicted by FIGS. 6A, 6B, given a peak found at timing T for frequency offset hypothesis F, additional "peaks" are added at time-frequency-offset positions for different Cell IDs as indicated in Table 1, for example. SSS Detection is carried out for OFDM symbols associated with all detected and added PSS peaks that are within the frequency tolerance of the receiver's demodulation oscillator, and the SSS associated with the strongest SSS Detection metrics is selected, yielding both the cell group ID and the closest frequency offset hypothesis.

In an initialization phase that is similar to that of the methods described above, a plurality of in-phase (I) and quadrature (Q) samples of the received signal are collected and stored in step 650; a cell ID counter i is set to zero in step 652; a grid of K frequency-offset hypotheses F0, F1, F2, . . . , F(K−1) is defined in step 654; a hypothesis counter k is set to zero in step 656; and a data segment counter m is set to zero in step 658. In step 660, otherwise conventional PSS Detection determines a correlation signal peak for a data segment m at a timing t for an assumed frequency offset hypothesis Fk and cell ID i. In step 662, it is determined whether PSS Detection on more data segments remain to be done. If so (Yes in step 662), the segment counter m is increased in step 664, and the process flow returns to step 660. If not (No in step 662), the process flow proceeds to step 666.

In step 666, correlation signal peaks found by step 660 for the data segments are evaluated and ranked according to one or more selectable criteria as described above, and it is determined in step 668 whether any strong and consistent correlation signal peak has been found. If not (No in step 668), the process flow proceeds to step 686 (see FIG. 6D). If so (Yes in step 668), the process flow proceeds to step 670, in which the highest-ranked peak (t, Fk), e.g., the peak found the most times, is selected. The process flow then proceeds to step 672 (see FIG. 6D).

In step 672, peaks are "added" (i.e., hypothesized) at time-frequency-offset positions for different Cell IDs as indicated in Table 1, for example. The number of "added" peaks and their time-frequency positions depend on the oscillator's tolerance and Cell ID as described above. After initializing a peak counter p to zero in step 674, it is determined whether the frequency offset for a peak is within the frequency tolerance limit in step 676. If so (Yes in step 676), otherwise conventional SSS Detection is carried out in step 678 for OFDM symbols associated with that peak, with the I, Q samples corresponding to the symbols being frequency compensated based on the corresponding frequency offset. If there are more peaks to examine (Yes in step 680), the peak counter p is incremented in step 682 and the process flow returns to step 676. If in step 676 the frequency offset for a peak is not within the limit (No in step 676), the process flow proceeds to step 680.

If there are no more peaks to examine (No in step 680), the time- and frequency-offset information and the cell ID of the PSS correlation signal peak that yields the strongest SSS Detection metrics are recorded (step 684), e.g., stored in a suitable memory. If there are more frequency-offset hypotheses in the grid (Yes in step 686), the process flow returns to step 688 (see FIG. 6C), in which the hypothesis counter k is incremented, and the data segment counter m is initialized to zero (step 658). If there are no more frequency hypotheses (No in step 686), it is determined whether there are more Cell IDs in step 690. If there are more possible cell IDs, (Yes in step 690), the process flow returns to step 692, in which the cell-ID counter i is incremented, and a new frequency offset grid is defined (step 654). Otherwise (No in step 690), the cell and frequency offset associated with the strongest SSS Detection metrics among the stored peaks are selected (step 694), yielding both the cell group ID and best (i.e., closest) frequency-offset hypothesis.

Some steps in FIGS. 6C-6D are substantially the same as steps in FIG. 6A or 6B but they have different reference numbers in order to enhance the clarity of the description. For the methods depicted by FIGS. 6A, 6B, 6C, and 6D, the grid of hypotheses over which the frequency offset is searched can be implemented in several ways, for example as depicted in FIG. 7A or 7B.

Figure 7A:
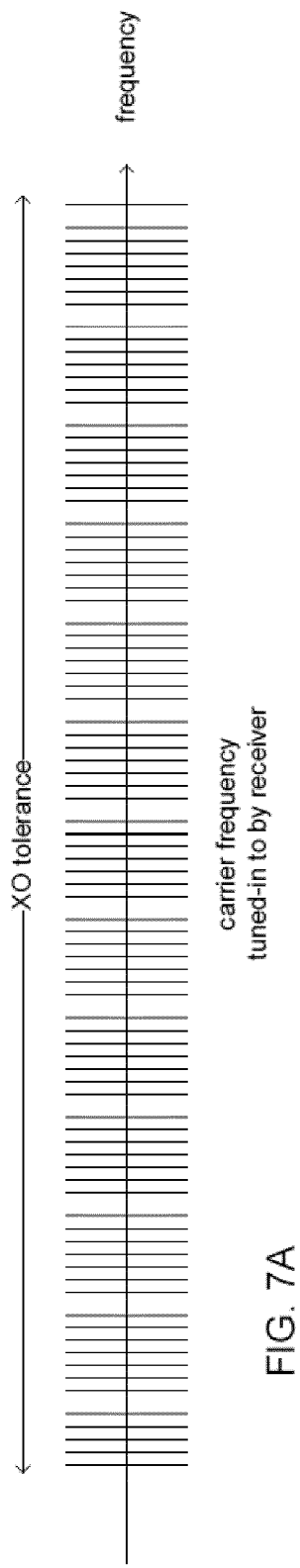
FIG. 7A illustrates a wide search approach concerning the frequency offsets examined in the actual PSS Detection, and the frequency offsets covered by the algorithm.

FIG. 7A illustrates a wide-search approach concerning the frequency offsets examined in the PSS Detection of FIGS. 6A-6D, and the frequency offsets covered by the cell search methods. As depicted in FIG. 7A, PSS Detection uses frequency-offset hypotheses that cover the full span of the receiver oscillator's frequency tolerance (indicated by the horizontal arrow). The frequency span covered by the hypotheses used in PSS Detection is indicated by the hatching, and the carrier (oscillator) frequency to which the receiver is tuned is assumed to be in the center of the span. The wide-search approach maximizes the probability of detecting a correlation signal peak (since the peaks at F=±30 kHz offset are somewhat lower than the peak at F=0 kHz offset).

Figure 7B:
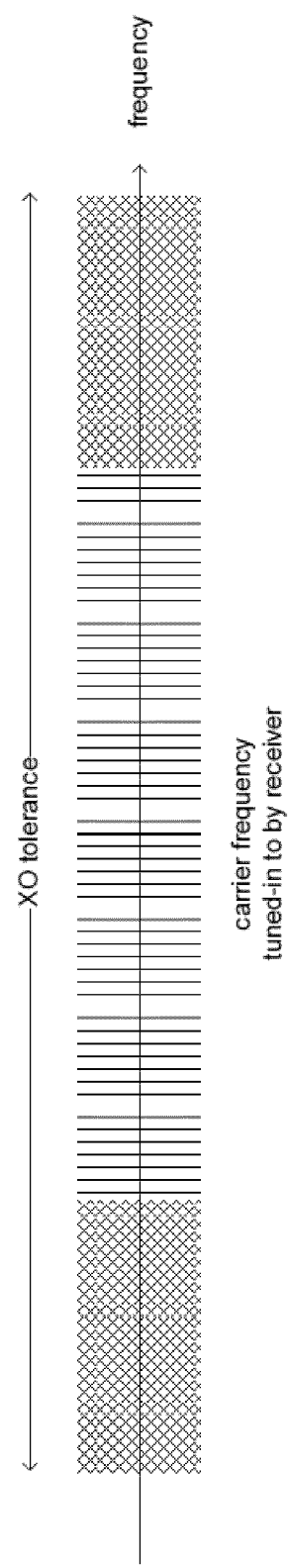
FIG. 7B illustrates a narrow search approach concerning the frequency offsets examined in the actual PSS Detection, and the frequency offsets covered by the algorithm.

FIG. 7B illustrates a narrow-search approach concerning the frequency offsets examined in the actual PSS Detection, and the frequency offsets covered by the cell search methods. As depicted in FIG. 7B, PSS Detection (and potentially subsequent frequency-offset refinement) uses frequency-offset hypotheses that cover less than the full span of the receiver oscillator's frequency tolerance (indicated by the horizontal arrow). The frequency span covered by the hypotheses used in PSS Detection is indicated by hatching, and the frequency span covered solely by hypothesized (added) peaks and not covered in the PSS detection is indicated by cross-hatching. The carrier (oscillator) frequency to which the receiver is tuned is assumed to be in the center of the span. For example as depicted in FIG. 7B, the frequency-offset hypotheses can cover only the central half of the oscillator's tolerance, i.e., ±15 kHz for a tolerance of ±30 kHz. The narrow-search approach recognizes that if a peak is found and if the found peak is a spurious peak, the systematic manner by which hypothesized peaks are added will enable the true peak to be evaluated in the SSS Detection.

The narrow-search approach has a possible advantage over the wide-search approach in that it can be completed faster. A possible drawback of the narrow-search approach is that the probability of detection may be relatively lower because the SNR of the PSS may be lower when the true frequency offset is outside the selected part of the oscillator tolerance region. Whether that drawback is acceptable depends on various factors, including the initial cell search ambition, and the specific receiver implementation (i.e., the receiver chain).

It should be understood that it is possible to mix the wide- and narrow-search approaches. For example, PSS Detection can use either a wide search or a narrow search, depending on the cell ID (i.e., the PSS version) and associated signal characteristics. For spurious peaks in the mixed-search approach, cell ID 0 has somewhat lower correlation peak magnitude than cell IDs 1 and 2 have, and so the narrow-search approach can be used for cell IDs 1 and 2 and the wide-search approach can be used for cell ID 0.

For all three approaches, the number of peaks evaluated in the SSS Detection stage can be varied (e.g., only the highest ranked PSS peak for a particular frequency offset hypothesis is evaluated, or several of the highest ranked peaks are evaluated).

It will be appreciated that methods and apparatus as described above can reduce the probability of misdetection of the physical layer cell ID and frequency offset by accounting for time-frequency ambiguities and evaluating PSS correlation signal peaks in the frequency domain. The number of (hypothetical) frequency offsets used in matched filtering (PSS Detection) can be reduced because if a detected peak is off by 30 kHz, the correct time-frequency location will still be examined in a validation step (SSS Detection), saving signal processing time and making initial cell search considerably faster. Also, lower-grade and hence cheaper oscillators can be used without causing problems in the user's experience with a receiver, such as a cellular telephone.

It will be appreciated that procedures described above are carried out repetitively as necessary, for example, to respond to the time-varying nature of communication channels between transmitters and receivers. To facilitate understanding, many aspects of this invention are described in terms of sequences of actions that can be performed by, for example, suitably configured elements of a programmable computer system. It will also be recognized that various actions could be performed by suitably configured specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method in a receiver of determining a timing and a frequency offset of a received signal, the signal being predetermined, comprising:
    a. correlating, in the receiver, the received signal to each of a plurality of local replicas of a first predetermined signal, wherein the local replicas correspond to respective, different frequency offsets $f_i$, i=1, 2, ..., N, in a frequency offset range $[f_a, f_b]$, thereby forming a plurality of first correlation results;
    b. determining a maximal peak $f_{max}$ and a timing $t_{max}$ of the maximal peak $f_{max}$ in the plurality of first correlation results;
    c. determining at least one frequency offset $f_j$ based on the maximal peak $f_{max}$ and at least one other timing $t_j$ based on $t_{max}$, wherein $f_j$ and $t_j$ are also based on characteristics of the first predetermined signal and are independent of a frequency offset of the maximal peak $f_{max}$;
    d. correlating, in the receiver, the received signal at ($t_{max}$, $f_{max}$) and ($t_j$, $f_j$) to a second predetermined signal, thereby forming at least two second correlation results; and
    e. determining the maximum of the at least two second correlation results, thereby determining the timing and the frequency offset.

2. The method of claim 1, wherein the received signal is periodic with a period T, and correlating the received signal to each of the plurality of local replicas comprises correlating received signals during each of more than one period T to each of the plurality of local replicas.

3. The method of claim 1, wherein the at least one frequency offset $f_j$ is included within the frequency offset range $[f_a, f_b]$.

4. The method of claim 1, wherein the second predetermined signal comprises at least one of a secondary synchronization signal and a reference signal in a Long Term Evolution mobile radio communication system.

5. The method of claim 1, wherein determining a maximal peak $f_{max}$ and a timing $t_{max}$ in the plurality of first correlation results comprises respectively determining a maximal peak $f_{max}$ and respective timing $t_{max}$ for each of the frequency offsets f, i=1, 2, ..., N.

6. The method of claim 1, wherein the received signal is correlated to each of a plurality of local replicas of the first predetermined signal that correspond to respective, different frequency offsets f, i=1, 2, ..., N, in a frequency offset range $[f_c, f_d]$ that is smaller than the frequency offset range $[f_a, f_b]$, and the at least one frequency offset f and at least one other timing $t_j$ are in a remainder of the frequency offset range $[f_a, f_b]$.

7. A non-transitory computer-readable medium having stored instructions that, when executed by a computer, cause the computer to carry out a method of determining a timing and a frequency offset of a received signal, the signal being predetermined, wherein the method comprises:
    a. correlating the received signal to each of a plurality of local replicas of a first predetermined signal, wherein the local replicas correspond to respective, different frequency offsets f, i=1, 2, ..., N, in a frequency offset range $[f_a, f_b]$, thereby forming a plurality of first correlation results;
    b. determining a maximal peak $f_{max}$ and a timing $t_{max}$ of the maximal peak $f_{max}$ in the plurality of first correlation results;
    c. determining at least one frequency offset $f_j$ based on the maximal peak $f_{max}$ and at least one other timing $t_j$ based on $t_{max}$, wherein $f_j$ and $t_j$ are also based on characteristics of the first predetermined signal and are independent of a frequency offset of the maximal peak $f_{max}$;
    d. correlating the received signal at ($t_{max}$, $f_{max}$) ($t_j$, $f_j$) to a second predetermined signal, thereby forming at least two second correlation results; and
    e. determining the maximum of the at least two second correlation results, thereby determining the timing and the frequency offset.

8. The non-transitory medium of claim 7, wherein the received signal is periodic with a period T, and correlating the received signal to each of the plurality of local replicas comprises correlating received signals during each of more than one period T to each of the plurality of local replicas.

9. The non-transitory medium of claim 7, wherein the at least one frequency offset f is included within the frequency offset range $[f_a, f_b]$.

10. The non-transitory medium of claim 7, wherein the second predetermined signal comprises at least one of a secondary synchronization signal and a reference signal in a Long Term Evolution mobile radio communication system.

11. The non-transitory medium of claim 7, wherein determining a maximal peak $f_{max}$ and a timing $t_{max}$ in the plurality of first correlation results comprises respectively determining a maximal peak $f_{max}$ and respective timing $t_{max}$ for each of the frequency offsets $f_i$, i=1, 2, . . . , N.

12. The non-transitory medium of claim 7, wherein the received signal is correlated to each of a plurality of local replicas of the first predetermined signal that correspond to respective, different frequency offsets $f_i$, i=1, 2, . . . , N, in a frequency offset range $[f_c, f_d]$ that is smaller than the frequency offset range $[f_a, f_b]$, and the at least one frequency offset f and at least one other timing $t_j$ are in a remainder of the frequency offset range $[f_a, f_b]$.

13. An apparatus in a receiver for determining a timing and a frequency offset of a received signal, the signal being predetermined, comprising:
a signal detector configured to
correlate the received signal to each of a plurality of local replicas of a first predetermined signal, wherein the local replicas correspond to respective, different frequency offsets f, i=1, 2, . . . , N, in a frequency offset range $[f_a, f_b]$, thereby forming a plurality of first correlation results;
to determine a maximal peak $f_{max}$ and a timing $t_{max}$ of the maximal peak $f_{max}$ in the plurality of first correlation results; to determine at least one frequency offset $f_j$ based on the maximal peak $f_{max}$ and at least one other timing $t_j$ based on $t_{max}$, wherein $f_j$ and $t_j$ are also based on characteristics of the first predetermined signal and are independent of a frequency offset of the maximal peak $f_{max}$;
to correlate the received signal at $(t_{max}, f_{max})$ and $(t_j, f_j)$ to a second predetermined signal, thereby forming at least two second correlation results; and to determine the maximum of the at least two second correlation results, thereby determining the timing and the frequency offset.

14. The apparatus of claim 13, wherein the received signal is periodic with a period T, and the signal detector is configured to correlate the received signal to each of the plurality of local replicas by correlating received signals during each of more than one period T to each of the plurality of local replicas.

15. The apparatus of claim 13, wherein the at least one frequency offset f is included within the frequency offset range $[f_a, f_b]$.

16. The apparatus of claim 13, wherein the second predetermined signal comprises at least one of a secondary synchronization signal and a reference signal in a Long Term Evolution mobile radio communication system.

17. The apparatus of claim 13, wherein the signal detector is configured to determine a maximal peak $f_{max}$ and a timing $t_{max}$ sin the plurality of first correlation results by respectively determining a maximal peak $f_{max}$ and respective timing $t_{max}$ for each of the frequency offsets $f_i$, i=1, 2, . . . , N.

18. The apparatus of claim 13, wherein the received signal is correlated to each of a plurality of local replicas of the first predetermined signal that correspond to respective, different frequency offsets $f_i$, i=1, 2, . . . N, in a frequency offset range $[f_c, f_d]$ that is smaller than the frequency offset range $[f_a, f_b]$, and the at least one frequency offset $f_j$ and at least one other timing $t_j$ are in a remainder of the frequency offset range $[f_a, f_b]$.

\* \* \* \* \*

UNITED STATES PATENT AND TRADEMARK OFFICE
CERTIFICATE OF CORRECTION

PATENT NO. : 8,447,005 B2  Page 1 of 2
APPLICATION NO. : 12/612800
DATED : May 21, 2013
INVENTOR(S) : Axmon et al.

It is certified that error appears in the above-identified patent and that said Letters Patent is hereby corrected as shown below:

On the Title Page, Item (57), under "ABSTRACT", in Column 2, Line 1, delete "have" and insert -- having --, therefor.

In the Specifications

In Column 11, Line 12, delete "remain" and insert -- remains --, therefor.

In the Claims

In Column 14, Line 28, in Claim 5, delete "f," and insert -- $f_i$, --, therefor.

In Column 14, Line 32, in Claim 6, delete "f," and insert -- $f_i$, --, therefor.

In Column 14, Line 34, in Claim 6, delete "f and" and insert -- $f_j$ and --, therefor.

In Column 14, Line 46, in Claim 7, delete "f," and insert -- $f_i$, --, therefor.

In Column 14, Line 57, in Claim 7, delete "($t_j$. $f_j$)" and insert -- ($t_j$, $f_j$) --, therefor.

In Column 15, Line 2, in Claim 9, delete "f is" and insert -- $f_j$ is --, therefor.

In Column 15, Line 19, in Claim 12, delete "f and" and insert -- $f_j$ and --, therefor.

In Column 15, Lines 26-30, in Claim 13, delete "correlate the......results;" and insert the same at Line 25, after "configured to".

In Column 15, Line 29, in Claim 13, delete "f," and insert -- $f_i$, --, therefor.

Signed and Sealed this
Seventh Day of January, 2014

Margaret A. Focarino
*Commissioner for Patents of the United States Patent and Trademark Office*

CERTIFICATE OF CORRECTION (continued)
U.S. Pat. No. 8,447,005 B2

In Column 16, Line 4, in Claim 13, delete "$(t_j. f_j)$" and insert -- $(t_j, f_j)$ --, therefor.

In Column 16, Line 16, in Claim 15, delete "f is" and insert -- $f_j$ is --, therefor.

In Column 16, Line 24, in Claim 17, delete "$t_{max}$ sin" and insert -- $t_{max}$ in --, therefor.